(12) United States Patent
Takahashi et al.

(10) Patent No.: US 9,841,535 B2
(45) Date of Patent: Dec. 12, 2017

(54) ANTIREFLECTION FILM, LENS, AND IMAGING DEVICE

(71) Applicant: FUJIFILM Corporation, Tokyo (JP)

(72) Inventors: Hiroki Takahashi, Saitama (JP); Takeshi Iida, Sano (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/468,863

(22) Filed: Mar. 24, 2017

(65) Prior Publication Data

US 2017/0192132 A1 Jul. 6, 2017

Related U.S. Application Data

(63) Continuation of application No. PCT/JP2015/075278, filed on Sep. 7, 2015.

(30) Foreign Application Priority Data

Sep. 30, 2014 (JP) .................................. 2014-202657

(51) Int. Cl.
*G02B 1/111* (2015.01)
*C03C 17/34* (2006.01)
*G02B 1/14* (2015.01)

(52) U.S. Cl.
CPC .......... *G02B 1/111* (2013.01); *C03C 17/3441* (2013.01); *C03C 17/3452* (2013.01);
(Continued)

(58) Field of Classification Search
CPC .. G02B 1/10; G02B 1/11; G02B 1/111; G02B 1/115; G02B 1/14; G02B 5/281;
(Continued)

(56) References Cited

U.S. PATENT DOCUMENTS

| 4,859,536 A | 8/1989 | Waddell et al. |
| 2003/0179454 A1* | 9/2003 | Thomsen ................ C03C 17/36 359/584 |
| 2009/0159840 A1 | 6/2009 | Oda et al. |

FOREIGN PATENT DOCUMENTS

| JP | 6-59120 A | 3/1994 |
| JP | 8-15501 A | 1/1996 |

(Continued)

OTHER PUBLICATIONS

International Search Report for PCT/JP2015/075278 (PCT/ISA/210) dated Dec. 8, 2015.
(Continued)

*Primary Examiner* — Kimberly N Kakalec
(74) *Attorney, Agent, or Firm* — Birch, Stewart, Kolasch & Birch, LLP

(57) ABSTRACT

Provided is an antireflection film having excellent abrasion resistance.
In the antireflection film, a hydrogenated carbon film as a first layer is formed on a surface of an optical substrate. A $MgF_2$ film as a second layer having a lower refractive index than the first layer is formed on the first layer. Likewise, a third layer formed of the hydrogenated carbon film, a fourth layer formed of the $MgF_2$ film, and a fifth layer formed of the hydrogenated carbon film are formed. During the formation of the hydrogenated carbon film, a mixed gas of argon and hydrogen is supplied to a vacuum chamber such that some of C—C bonds in the film are replaced with C—H bonds. Due to the C—H bonds, an antireflection film having excellent abrasion resistance and adhesiveness and having a low refractive index can be obtained.

4 Claims, 11 Drawing Sheets

(52) U.S. Cl.
CPC ............ *G02B 1/14* (2015.01); *C03C 2217/28* (2013.01); *C03C 2217/734* (2013.01); *C03C 2218/154* (2013.01)

(58) Field of Classification Search
CPC ..... C03C 17/28; C03C 17/34; C03C 17/3405; C03C 17/3411; C03C 17/3452
See application file for complete search history.

(56) References Cited

FOREIGN PATENT DOCUMENTS

| | | |
|---|---|---|
| JP | 2002-156507 A | 5/2002 |
| JP | 2006-36611 A | 2/2006 |
| JP | 2006-72031 A | 3/2006 |
| JP | 2008-268281 A | 11/2008 |
| JP | 2010-181514 A | 8/2010 |
| JP | 2011-221048 A | 11/2011 |
| JP | 2014-32213 A | 2/2014 |
| WO | WO 2009/038143 A1 | 3/2009 |
| WO | WO 2014/008484 A2 | 1/2014 |

OTHER PUBLICATIONS

Written Opinion of the International Searching Authority for PCT/JP2015/075278 (PCT/ISA/237) dated Dec. 8, 2015.

\* cited by examiner

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

EXAMPLE 12

ANTIREFLECTION FILM, LENS, AND IMAGING DEVICE

CROSS-REFERENCE TO RELATED APPLICATION

This application is a Continuation of PCT International Application PCT/JP2015/075278 filed on 7 Sep. 2015, which claims priority under 35 USC 119(a) from Japanese Patent Application No. 2014-202657 filed on 30 Sep. 2014. The above application is hereby expressly incorporated by reference, in its entirety, into the present application.

BACKGROUND OF THE INVENTION

1. Field of the Invention

The present invention relates to an antireflection film which is provided on a surface of an optical filter, a lens, or the like, a lens, and an imaging device.

2. Description of the Related Art

An optical device in which an optical substrate such as a lens or various optical filters is used, for example, a digital camera, an image scanner, or a display device such as a liquid crystal display device or a projector has been widely used. A shape or an optical operation of the optical substrate varies depending on the intended use and the like. In either case, in general, an antireflection film is provided on a surface of the optical substrate. This configuration is to prevent the light use efficiency from being decreased due to loss caused by surface reflection of a lens or various optical filters.

As the antireflection film, for example, a multi-layer film including a plurality of thin films having different refractive indices is known (JP2002-156507A). In the antireflection film, for example, a combination of layers, refractive indices of layers, the number of layers, or the laminating order vary depending on a wavelength range to be used. For example, in a case where two or more materials are used, a high refractive index film, which is formed of a high refractive index material, and a low refractive index film, which is formed of a low refractive index material having a lower refractive index than the high refractive index film, are alternately laminated.

In addition, an antireflection film in which a diamond-like carbon (DLC) film as a protective layer is provided on the top layer is known (JP2010-181514A and JP2008-268281A).

In a case where the combination of the high refractive index film and the low refractive index film is used as described in JP2002-156507A, the low refractive index film is disposed on the outermost layer (first layer on the air side) of the antireflection film in order to reduce Fresnel reflection. As the low refractive index film, a metal fluoride film having a refractive index of about 1.2 at a wavelength of 10.5 μm is used in many cases. However, the metal fluoride film has a low hardness and thus has a problem in that it is easily damaged.

On the other hand, in a case where a DLC film as a protective film is provided on the top layer as described in JP2010-181514A and JP2008-268281A, the improvement of abrasion resistance can be realized by the DLC film. However, the refractive index of the DLC film is about 2, and the Fresnel reflection intensity thereof is about four times that of the metal fluoride film. Therefore, even in a case where a DLC film is disposed on the top layer simply in order to improve abrasion resistance, there is a problem in that desired reflection properties cannot be obtained.

In addition, in a case where a DLC film is provided as a protective layer as described in JP2010-181514A and JP2008-268281A, it is necessary that an interlayer is provided between the metal fluoride film and the DLC film in order to improve adhesiveness. Therefore, it is necessary to provide an interlayer or to form a low refractive index film using an interlayer. Thus, the degree of freedom in the design of an antireflection film deteriorates, and the optimization is difficult to perform. Further, in a case where a DLC film is provided simply as a high refractive index film, there is a problem in that the DLC film may crack after the formation.

SUMMARY OF THE INVENTION

The present invention has been made in order to solve the above-described problems, and an object thereof is to provide an antireflection film which has excellent antireflection properties and abrasion resistance and does not crack, a lens, and an imaging device.

According to the present invention, there is provided an antireflection film comprising: a substrate; and a high refractive index layer and a low refractive index layer that are alternately laminated in order from the substrate, the low refractive index layer having a lower refractive index than the high refractive index layer. The high refractive index layer is formed of a hydrogenated carbon film having a refractive index of 1.7 to 2.25 at a wavelength of 10.5 μm, the low refractive index layer is formed of a metal fluoride compound film, and a top layer of the antireflection film is formed of the hydrogenated carbon film.

It is preferable that a hydrogen content ch in the hydrogenated carbon film as the top layer is in a range of 0 [at. %]<ch≤7.5 [at. %]. In addition, it is preferable that the substrate is formed of chalcogenide glass in which the sum of a composition ratio of germanium (Ge) and a composition ratio of selenium (Se) is 60% or higher.

It is preferable that the substrate is formed of chalcogenide glass in which the sum of a composition ratio of germanium and a composition ratio of selenium is 60% or higher, that the antireflection film has a five-layer structure including first to fifth layers in order from the substrate side, that the first layer is formed of a hydrogenated carbon film and has an optical thickness in a range of 2700 nm to 3100 nm, that a second layer is formed of a $MgF_2$ film and has an optical thickness in a range of 600 nm to 2100 nm, that a third layer is formed of a hydrogenated carbon film and has an optical thickness in a range of 300 nm to 1700 nm, that a fourth layer is formed of a $MgF_2$ film and has an optical thickness in a range of 2200 nm to 3500 nm, and that the fifth layer is formed of a hydrogenated carbon film and has an optical thickness in a range of 100 nm to 300 nm. In addition, it is preferable that the substrate has a refractive index of 2.4 to 2.6 at a wavelength of 10.5 μm and has a reflectance of 0.5% or lower in a wavelength range of 8 μm to 14 μm. The optical thickness is obtained by multiplying the physical thickness of a film by the refractive index of a material forming the film at a wavelength of 10.5 μm.

A lens according to the present invention includes the above-described antireflection film. An imaging device according to the present invention includes at least one chalcogenide glass lens including the above-described antireflection film.

According to the present invention, the top layer of the antireflection film which is formed on the substrate is formed of the hydrogenated carbon film having a refractive index of 1.7 to 2.25 at a wavelength of 10.5 μm. As a result, the antireflection film having excellent abrasion resistance can obtained. In addition, the bottom layer of the antireflection film is formed of the hydrogenated carbon film having a refractive index of 1.7 to 2.25 at a wavelength of 10.5 μm. As a result, the adhesiveness of the hydrogenated carbon film with the substrate can be improved, and cracking can be prevented.

DESCRIPTION OF THE PREFERRED EMBODIMENTS

Figure 1:
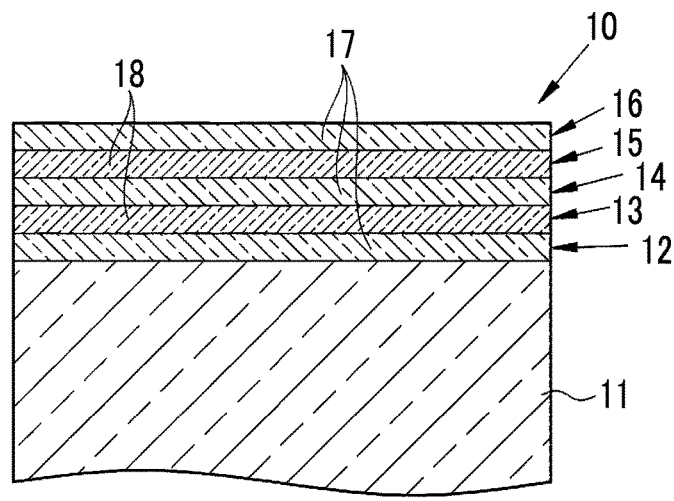
FIG. 1 is a cross-sectional view showing an antireflection film according to the present invention including five layers.

As shown in FIG. 1, an antireflection film 10 for chalcogenide glass (hereinafter, referred to simply as "antireflection film") according to the present invention is provided on a surface of an optical substrate 11. The optical substrate 11 is a lens or an optical filter that is formed by using chalcogenide glass (in which the sum of a composition ratio of Ge and a composition ratio of Se is 60% or higher) as a substrate. In FIG. 1, the optical substrate 11 is formed of one material. However, for example, an optical functional film such as a polarization separation film or a dichroic film may be formed on a surface of the optical substrate 11. In this case, the antireflection film 10 is formed on the optical functional film. In addition, in FIG. 1, the optical substrate 11 has a planar surface but may have a curved surface on which a lens surface is formed. In addition, in FIG. 1, the antireflection film 10 is formed on a single surface of the optical substrate 11. However, the antireflection film 10 may be formed on both surfaces of the optical substrate 11.

The antireflection film 10 is a multi-layer film in which two kinds of thin films having different refractive indices are laminated, in which a first layer 12, a second layer 13, a third layer 14, a fourth layer 15, and a fifth layer 16 are formed in this order from the optical substrate 11 side. The first layer 12, the third layer 14, and the fifth layer 16 are formed of a hydrogenated carbon film 17 and function as a high refractive index layer. The second layer 13 and the fourth layer 15 are formed of a magnesium fluoride ($MgF_2$) film 18 and function as a low refractive index layer having a lower refractive index than the high refractive index layer. The fifth layer 16 is exposed at an air interface.

The first layer 12 is formed of the hydrogenated carbon film 17. The optical thickness of the first layer 12 is in a range of 2700 nm to 3100 nm. The second layer 13 is formed of the $MgF_2$ film 18. The optical thickness of the second layer 13 is in a range of 600 nm to 2100 nm. The third layer 14 is formed of the hydrogenated carbon film 17. The optical thickness of the third layer 14 is in a range of 300 nm to 1700 nm. The fourth layer 15 is formed of the $MgF_2$ film 18 and has an optical thickness in a range of 2200 nm to 3500 nm. The fifth layer 16 is formed of the hydrogenated carbon film 17. The optical thickness of the fifth layer 16 is in a range of 100 nm to 300 nm. It is preferable that the first layer 12 is formed of the hydrogenated carbon film 17 and has an optical thickness in a range of 2800 nm to 3100 nm and that the third layer 14 is formed of the hydrogenated carbon film 17 and has an optical thickness in a range of 500 nm to 1700 nm. It is more preferable that the first layer 12 is formed of the hydrogenated carbon film 17 and has an optical thickness in a range of 2850 nm to 3100 nm and that the third layer 14 is formed of the hydrogenated carbon film 17 and has an optical thickness in a range of 600 nm to 1700 nm.

Figure 2:
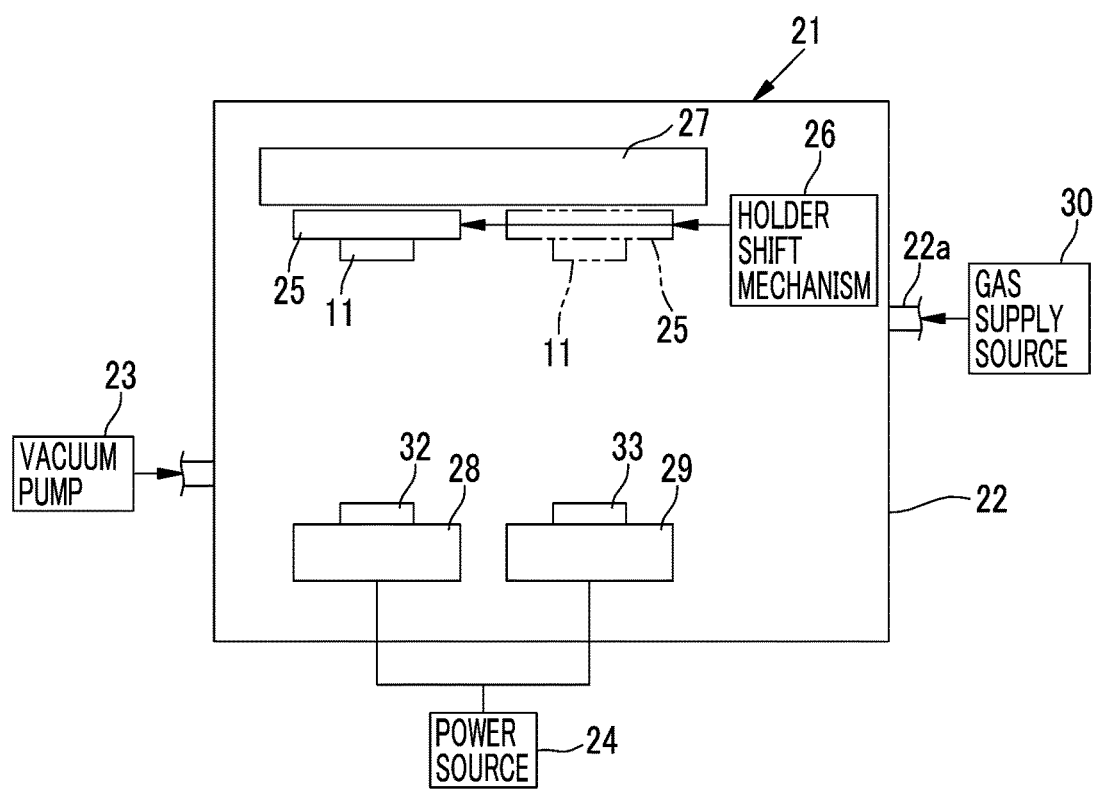
FIG. 2 is a front view showing the summary of a sputtering equipment which forms an antireflection film.

As shown in FIG. 2, the hydrogenated carbon film 17 and the $MgF_2$ film 18 are formed by sputtering using a radio-frequency (RF) magnetron sputtering equipment (hereinafter, referred to simply as "sputtering equipment") 21. This sputtering equipment 21 includes a vacuum chamber 22, a vacuum pump 23, and a power source 24. In the vacuum chamber 22, for example, a substrate holder 25, a holder shift mechanism 26, a heater 27, target holders 28 and 29, a vacuum gauge (not shown), and a film thickness meter (not shown) are provided.

A gas supply source 30 is connected to the vacuum chamber 22 through a gas introduction port 22a. The vacuum pump 23 evacuates the vacuum chamber 22. The gas supply source 30 supplies a mixed gas (Ar+H$_2$) of argon (Ar) and hydrogen (H$_2$) or argon gas (Ar) to the vacuum chamber 22. The mixed gas (Ar+H$_2$) is supplied to the vacuum chamber 22 during the formation of the hydrogenated carbon film 17, and Ar gas is supplied to the vacuum chamber 22 during the formation of the MgF$_2$ film 18. In these gas atmospheres, sputtering is performed.

The substrate holder 25 holds the optical substrate 11 on which the antireflection film 10 is formed. The holder shift mechanism 26 moves the substrate holder 25 in a horizontal direction such that the optical substrate 11 is selectively positioned above the target holders 28 and 29.

One of the target holders 28 and 29 holds a carbon target 32, and the other one holds a MgF$_2$ target 33. Each of the target holders 28 and 29 has a permanent magnet (not shown) and is connected to the power source 24. Ar atoms which are ionized by the power source 24 applying a voltage thereto are accelerated and have a high kinetic energy. At this time, the accelerated Ar ions collide against a surface of one of the targets 32 and 33 for film formation such that the high kinetic energy of the Ar ions is transferred to target atoms. The target atoms having the energy are accelerated at a high speed, are emitted from one of the targets 32 and 33, and are deposited on the optical substrate 11 to form a film.

First, the optical substrate 11 is positioned above the carbon target 32 by the holder shift mechanism 26, and the hydrogenated carbon film 17 formed as the first layer 12. After the hydrogenated carbon film 17 having a desired thickness is formed, the optical substrate 11 is positioned above the MgF$_2$ target 33, and the MgF$_2$ film 18 is formed as the second layer 13. Next, by repeating the same operations as described above, the third layer 14 formed of the hydrogenated carbon film 17, the fourth layer 15 formed of the MgF$_2$ film 18, and the fifth layer 16 formed of the hydrogenated carbon film 17 are formed in this order on the optical substrate 11.

During sputtering for obtaining the hydrogenated carbon film 17 having a desired refractive index, the ratio of the flow rate of hydrogen in the mixed gas may be changed while fixing a sputtering power to a given value, the sputtering power may be changed while fixing the ratio of the flow rate of hydrogen in the mixed gas to a given value, or the sputtering power and the ratio of the flow rate of hydrogen in the mixed gas may be changed. In addition, as a method of obtaining the desired thickness, a method of measuring the thickness of the layers using a film thickness meter during the formation of the layers, a method of determining a sputtering time based on a relationship between the sputtering time and the thickness under various conditions which is obtained in advance, or a combination of the methods may be adopted.

In the above-described embodiment, the antireflection film 10 is formed in which the five layers are laminated by alternately providing the high refractive index layer formed of the hydrogenated carbon film 17 and the low refractive index layer formed of the MgF$_2$ film 18. However, in the antireflection film 10 according to the present invention, the sum of the number of high refractive index layers formed of the hydrogenated carbon film 17 and the number of low refractive index layers formed of the MgF$_2$ film 18 only has to be an odd number. That is, it is only necessary that the top layer and the bottom layer are formed of the hydrogenated carbon film 17 and that the hydrogenated carbon film 17 and the MgF$_2$ film 18 are alternately formed. The number of layers in the antireflection film 10 may be 3 or 7. In a case where the number of layers in the antireflection film 10 is 3, it is difficult to reduce an average reflectance to be lower than that in a case where the number of layers in the antireflection film 10 is 5. In a case where the number of layers in the antireflection film 10 is 7 or more, the effect of reducing an average reflectance decreases as the number of layers in the antireflection film 10 increases. Therefore, the overall evaluation deteriorates as compared to a case where the number of layers in the antireflection film 10 is 5.

In the above-described embodiment, all of high refractive index layers in the antireflection film 10 are formed of the hydrogenated carbon film 17. However, as the high refractive index layer formed of the hydrogenated carbon film 17, only the first layer 12 in contact with the optical substrate 11 and the fifth layer 16 as the top layer may be used. In this case, the third layer 14 is formed of ZnS or Ge. Further, the second layer 13 and the fourth layer 15 may also be formed of a metal fluoride film other than MgF$_2$.

Figure 3:
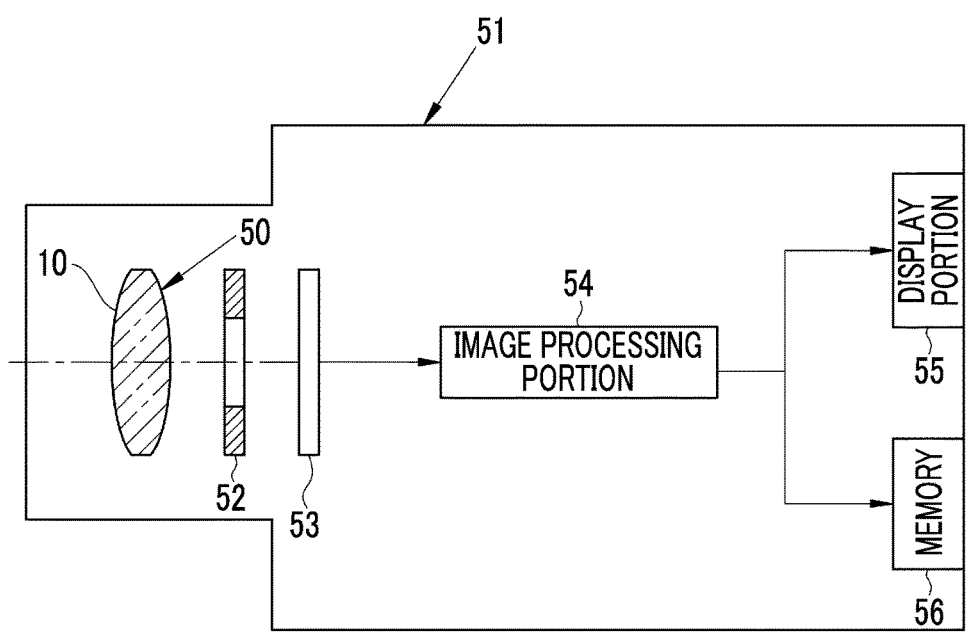
FIG. 3 is a schematic diagram showing a far infrared camera which includes a lens including the antireflection film according to the present invention.

FIG. 3 is a far infrared camera (imaging device) 51 which includes a chalcogenide glass lens 50 including the antireflection film 10 according to the present invention. The far infrared camera 51 detects a radiation energy (heat) in a wavelength range of 8 to 14 μm (which has the same meaning as 8 μm or longer and 14 μm or shorter; hereinafter, the expression "to" is used to express a range including boundary values) generated from an object and converts a small amount of temperature change into an electrical signal to display an image. To that end, the far infrared camera 51 includes not only the lens 50 but also a diaphragm 52, an uncooled far infrared array sensor 53 that operates at room temperature, an image processing portion 54, a display portion 55, and a memory 56. The single lens 50 or a plurality of lenses 50 may be used in which at least one lens 50 includes the antireflection film 10 according to the present invention. The far infrared camera 51 is used, for example, not only as a night vision for a vehicle but also as a surveillance camera for monitoring an intruder or the like at night, as a camera for repair and maintenance such as building diagnosis or equipment diagnosis, or as a mechanical camera for automatically detecting a person with fever.

EXAMPLES

In order to verify the effects of the present invention, an experiment was performed, in which the hydrogenated carbon film 17 was formed on a surface of the optical substrate 11 formed of chalcogenide glass to examine the abrasion resistance of the hydrogenated carbon film 17 and the adhesiveness thereof with the optical substrate 11.

Method of Forming Hydrogenated Carbon Film

Using the RF magnetron sputtering equipment (BMS-800, manufactured by Shincron Co., Ltd.) 21 schematically shown in FIG. 2, the hydrogenated carbon film 17 was formed on the optical substrate 11 by using a six-inch diameter target (manufactured by Ulvac Inc.) as the carbon target 32.

Forming conditions were as follows.

Sputtering power: 750 W (during formation of the hydrogenated carbon film 17), 375 W (during the formation of the MgF$_2$ film 18)

Sputtering gas: a mixed gas Ar+$H_2$ (flow rate: 120 sccm; during the formation of the hydrogenated carbon film 17), Ar gas (flow rate: 120 sccm; during the formation of the $MgF_2$ film 18)

Sputtering gas pressure: 0.2 Pa

Distance between the optical substrate 11 and the targets 32 and 33: 120 mm Heating temperature of the optical substrate 11: heated to 300° C. by the heater 27

First, Experiments 1 to 8 were performed while changing the ratio of the flow rate of $H_2$ gas in the mixed gas Ar+$H_2$ (the flow rate was fixed to 120 sccm) to prepare eight hydrogenated carbon films 17 as Samples 1 to 8. The refractive index of each of the obtained hydrogenated carbon films 17 was measured using a spectroscopic ellipsometer (IR-Vase, manufactured by J. A. Woollam Co., Inc.).

Figure 4:
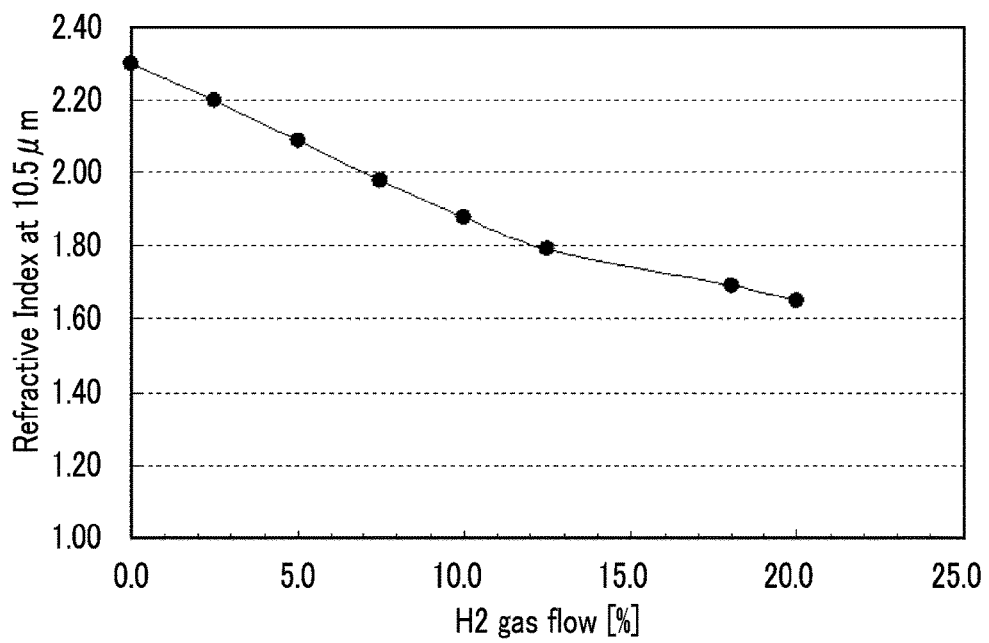
FIG. 4 is a graph showing a relationship between a ratio of the flow rate of hydrogen and a refractive index of an obtained hydrogenated carbon film 17.

FIG. 4 shows a relationship between a ratio of the flow rate of hydrogen and a refractive index of the obtained hydrogenated carbon film 17. It can be seen from FIG. 4 that, as the ratio of the flow rate of hydrogen increases, the refractive index of the hydrogenated carbon film 17 decreases. This decrease in refractive index is caused by hydrogen being incorporated into the hydrogenated carbon film 17. As the ratio of the flow rate of hydrogen to the flow rate of Ar gas increases, the hydrogen content ch in the hydrogenated carbon film 17 increases. The increase in the hydrogen content ch leads to a decrease in film density, and the refractive index decreases due to the decreases in film density.

Figure 5:
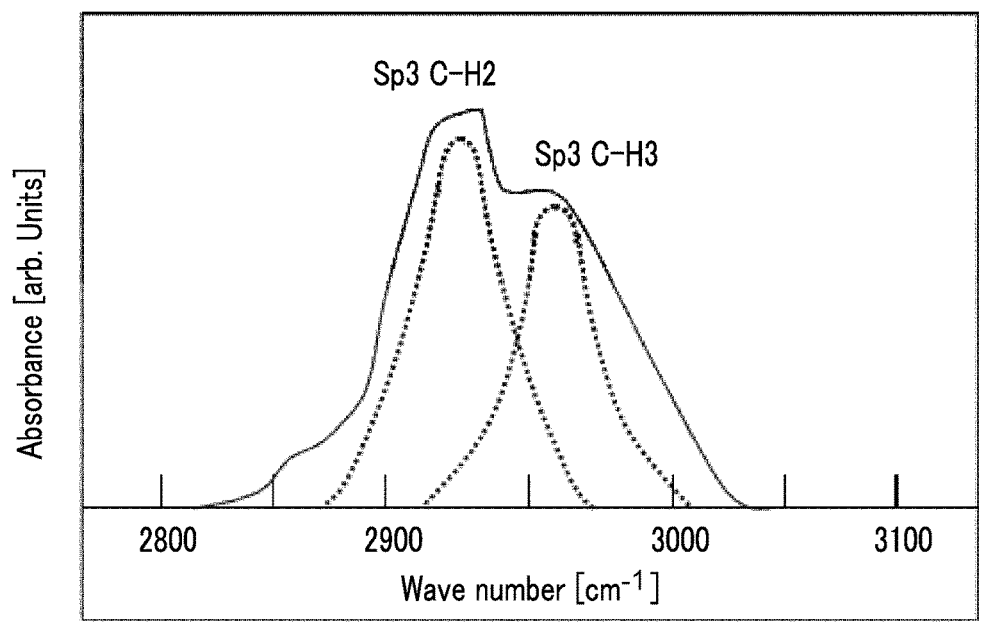
FIG. 5 is a graph showing the results of FT-IR spectroscopy of the hydrogenated carbon film and showing a relationship between a wave number and an absorbance.
Figure 6:
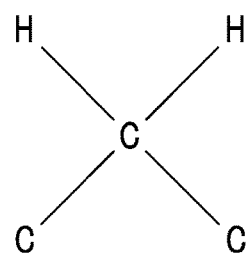
FIG. 6 is a diagram showing a C—H2 bond in which two hydrogen atoms are bonded to a carbon atom.
Figure 7:
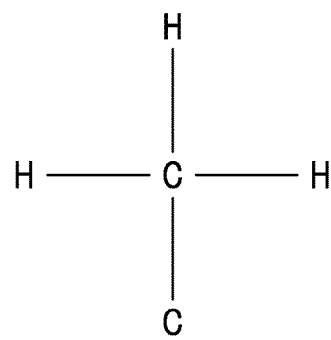
FIG. 7 is a diagram showing a C—H3 bond in which three hydrogen atoms are bonded to a carbon atom.

FIG. 5 shows the results of measuring the obtained hydrogenated carbon film 17 using a FT-IR (FT/IR 4200, manufactured by Jasco Corporation), in which the horizontal axis represents a wave number and the vertical axis represents an absorbance. As can be seen from FIG. 5, a first absorption peak was shown at a wave number of about 2930 $cm^{-1}$, and a second absorption peak was shown at a wave number of about 2970 $cm^{-1}$. The first absorption peak was derived from a structure shown in FIG. 6 in which two hydrogen atoms are bonded to a carbon atom, and the second absorption peak was derived from a structure shown in FIG. 7 in which three hydrogen atoms are bonded to a carbon atom.

Figure 8:
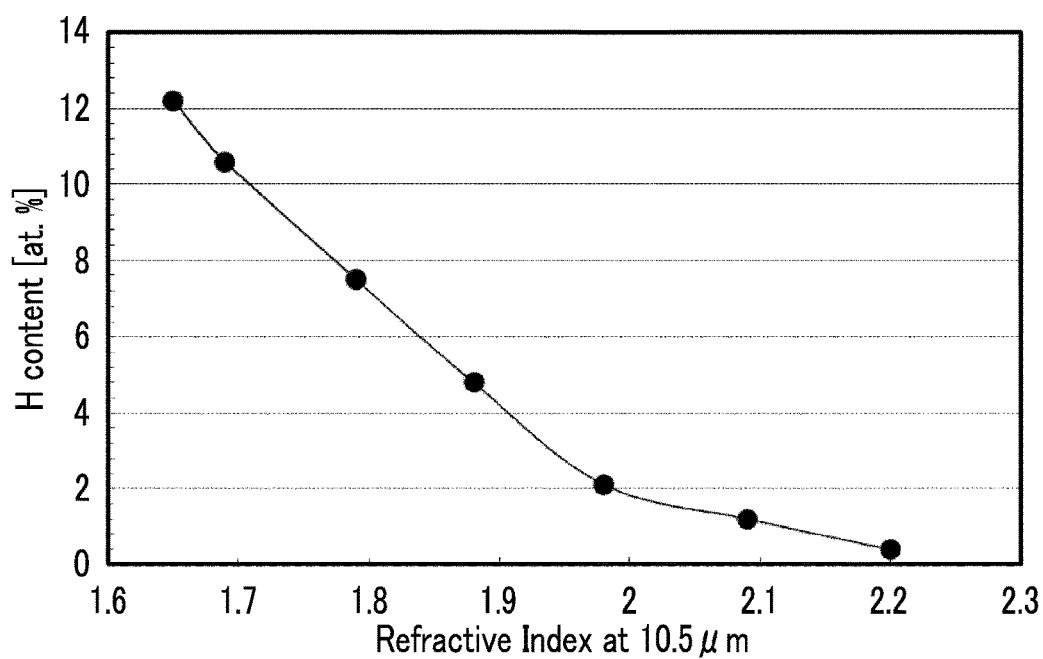
FIG. 8 is a graph showing a relationship between a refractive index of a hydrogenated carbon film and a hydrogen content thereof.

FIG. 8 shows a relationship between the refractive index of the hydrogenated carbon film 17 and the hydrogen content ch in the film. In FIG. 8, the horizontal axis represents the refractive index of the hydrogenated carbon film 17 at 10.5 μm, and the vertical axis represents the hydrogen content ch (H content) in the film 17. The hydrogen content ch in the film 16 was measured by elastic recoil detection analysis (ERDA). As is known in the art, in the elastic recoil detection analysis, a sample was bombarded with helium ions such that an atom in the sample was forwardly scattered, and this scattered element was detected. This elastic recoil detection analysis is suitable for measuring the hydrogen content ch in the film.

The phenomenon shown in FIG. 4 in which the refractive index decreases along with an increase in the ratio of the flow rate of hydrogen correlates to the hydrogen content ch in the film as shown in FIG. 8. The following can be seen from FIG. 8 that: in a case where the refractive index is 2.0 or higher, the amount of C—H2 bonds is large; and in a case where the refractive index is lower than 2.0, the amount of C—H3 bonds rapidly increases. The amount of each of C—H2 bonds and C—H3 bonds in FIG. 8 was estimated from peaks of a C—H stretching mode appearing in a range of 2900 to 3000 $cm^{-1}$ in the results of FT-IR spectroscopy.

It can be seen from a binding energy of a C1s orbital in X-ray photoelectron spectroscopy (XPS; in which X-rays were used) that the C skeleton of the hydrogenated carbon film 17 was a mixture of sp3 (diamond structure) and sp2 (graphite structure). A ratio between the structures was constant irrespective of the ratio of the flow rate of hydrogen to the flow rate to Ar gas. In X-ray photoelectron spectroscopy, a material is irradiated with X-rays such that photoelectrons in the material are emitted to the outside, and the number of photoelectrons emitted and the kinetic energy thereof were measured. As a result, the energy of states in which the electrons occupy the material and the density of states thereof can be obtained. The experiment results are shown in Table 1.

TABLE 1

| Experiment No. (Sample No.) | Ratio of Flow Rate of $H_2$ gas [%] | Refractive Index at 10.5 μm | Hydrogen Content [at. %] | Main Bond | Evaluation of Abrasion Resistance | Evaluation of Adhesiveness |
| --- | --- | --- | --- | --- | --- | --- |
| 1 | 20.0 | 1.65 | 12.2 | C—H3 | D | D |
| 2 | 18.0 | 1.69 | 10.6 | C—H3 | D | D |
| 3 | 12.5 | 1.79 | 7.5 | C—H3 | C | C |
| 4 | 10.0 | 1.88 | 4.8 | C—H3 | B | B |
| 5 | 7.5 | 1.98 | 2.1 | C—H3 | A | A |
| 6 | 5.0 | 2.09 | 1.2 | C—H2 | A | A |
| 7 | 2.5 | 2.20 | 0.4 | C—H2 | A | A |
| 8 | 0.0 | 2.30 | 0.0 | — | A | A |

In Experiments 1 to 8, Samples 1 to 8 of Table 1 were formed by changing the ratio of the flow rate of hydrogen to the flow rate of Ar gas while fixing the sputtering power to a given value, and each of the hydrogenated carbon films 17 was deposited in a thickness of 100 nm on the optical substrate 11 formed of flat chalcogenide glass (Ge: 20%, Se: 65%, and Sb: 15%). The optical substrate 11 was a circulate plate having an outer diameter of 30 mm and a thickness of 1.0 mm. The abrasion resistance of the hydrogenated carbon film 17 was evaluated using a tapered abrasion tester (EHm-50, manufactured by Kawasaki Metal). Abrasion conditions were determined according to abrasion resistance (abrasion ring method) of JIS K5600 "Testing methods for paints", and a rotating speed was 35 rpm, and an abrasion ring was CS10 (load: 4.9 N). After performing the abrasion test three times, the damage state of the hydrogenated carbon film 17 was determined by visual inspection. The results of the visual inspection are evaluated as follows. A case where the hydrogenated carbon film 17 was not damaged was evaluated as A. A case where the hydrogenated carbon film 17 was damaged but the surface of the optical substrate 11 was not exposed was evaluated as B. A case where the hydrogenated carbon film 17 was damaged but the surface of the optical substrate 11 was partially exposed was evaluated as C. A case where the hydrogenated carbon film 17 was damaged but the surface of the optical substrate 11 was exposed was evaluated as D. The evaluation results A, B, and C are in the allowable range, and the evaluation result D is out of the allowable range.

As can be seen from Table 1, in Samples 5 to 8 in which the hydrogen content ch in the hydrogenated carbon film 17 was 2.1 at. % or lower (the refractive index was 1.98 or higher), the hydrogenated carbon film 17 was evaluated as A and was not damaged. In Sample 4 in which the hydrogen content ch in the hydrogenated carbon film 17 was higher than 2.1 at. % and 5.0 at % or lower, the hydrogenated carbon film 17 was evaluated as B and was damaged, but the surface of the optical substrate 11 was not exposed. In Sample 3 in which the hydrogen content ch in the hydrogenated carbon film 17 was higher than 5.0 at. % and 7.5 at % or lower, the hydrogenated carbon film 17 was evaluated as C and was damaged, and the surface of the optical substrate 11 was exposed. In Samples 1 and 2 in which the hydrogen content ch in the hydrogenated carbon film 17 was higher than 7.5 at. %, the hydrogenated carbon film 17 was evaluated as D and was damaged, and the surface of the optical substrate 11 was exposed. It can be seen from the above results that the hydrogen content ch in the hydrogenated carbon film 17 having abrasion resistance is preferably 7.5 at % or lower, more preferably 5.0 at % or lower, and still more preferably 2.1 at % or lower. The reason for this is presumed that, in a case where the amount of C—H3 bonds is increased in the hydrogenated carbon film 17, the amount of C—C bonds which form the hydrogenated carbon film 17 is decreased, which decreases the abrasion strength.

The adhesive strength of each of the hydrogenated carbon films 17 with the optical substrate 11 was evaluated using a tape test method according to JIS-H-8504 15.1 and MIL-C-48497A. In the tape test method, each of the samples 1 to 8 was left to stand in an environment of temperature: 60° C. and relative humidity: 90% for 240 hours. Next, a cellophane tape (manufactured by Nichiban Co., Ltd.; width: 12 mm) having a length of 10 mm was attached to the hydrogenated carbon film 17 and then was rapidly peeled off in a vertical direction. This operation was performed three times, and then the peeling state of the hydrogenated carbon film 17 was observed by visual inspection. The hydrogenated carbon film 17 was evaluated from the observation result based on the following criteria.

Rank A: the hydrogenated carbon film 17 was not peeled off even after the peeling operation was repeated three times Rank B: the hydrogenated carbon film 17 as the fifth layer 16 was damaged in the event that the peeling operation was repeated three times, and the surface of the optical substrate 11 was not exposed Rank C: the hydrogenated carbon film 17 as the fifth layer 16 was damaged in the event that the peeling operation was repeated two times, and the surface of the optical substrate 11 was not exposed Rank D: the hydrogenated carbon film 17 as the fifth layer 16 was damaged in the event that the peeling operation was repeated once, and the surface of the optical substrate 11 was exposed The evaluation results A, B, and C are in the allowable range, and the evaluation result D is out of the allowable range.

As can be seen from the evaluation of adhesiveness in Table 1, in Samples 5 to 8 in which the hydrogen content ch in the hydrogenated carbon film 17 was 2.1 at. % or lower (the refractive index was 1.98 or higher), the hydrogenated carbon film 17 was not damaged and was evaluated as A. In Sample 4 in which the hydrogen content ch in the hydrogenated carbon film 17 was higher than 2.1 at % and 5.0 at % or lower, the hydrogenated carbon film 17 was evaluated as B and was damaged but was not peeled off. In Sample 3 in which the hydrogen content ch in the hydrogenated carbon film 17 was higher than 5.0 at. % and 7.5 at % or lower, the hydrogenated carbon film 17 was evaluated as C and was damaged, and the surface of the optical substrate 11 was exposed. Further, In Samples 1 and 2 in which the hydrogen content ch in the hydrogenated carbon film 17 was higher than 7.5 at. %, the hydrogenated carbon film 17 was evaluated as D and was damaged, and the surface of the optical substrate 11 was exposed. Based on the above results, the following can be seen that the hydrogen content ch in the hydrogenated carbon film 17 at which the adhesiveness with the optical substrate 11 is maintained is 7.5 at. % or lower and preferably 5.0 at. % or lower, and the most preferable range thereof for preventing the peeling of the film is 2.1 at % or lower.

Next, using the sputtering equipment 21 shown in FIG. 2, the hydrogenated carbon film 17 and the $MgF_2$ film 18 were alternately formed on the optical substrate 11 to prepare the antireflection film 10 having a five-layer configuration. As the optical substrate 11, chalcogenide glass (KG-1, manufactured by Opto Create Co., Ltd.; reflectance at 10.5 μm: 2.59) including 20% of Ge, 65% of Se, and 15% of Sb was used.

In Examples 1 to 6, the optical thickness of the first layer 12 was in a range of 2850 nm to 3100 nm, and the optical thickness of the third layer 14 is in a range of 600 nm to 1700 nm. In Examples 1 to 6, the average reflectance in a wavelength range of 8 to 14 μm was 0.21% or lower. In Examples 7 to 10, the optical thickness of the first layer 12 was in a range of 2800 nm to 3100 nm, and the optical thickness of the third layer 14 is in a range of 500 nm to 1700 nm. In Examples 7 to 10, the average reflectance in a wavelength range of 8 to 14 μm was 0.28% to 0.49%. Further, in Examples 11 to 13, the optical thickness of the first layer 12 was in a range of 2700 nm to 3100 nm, and the optical thickness of the third layer 14 is in a range of 300 nm to 1700 nm. In Examples 11 to 13, the average reflectance in a wavelength range of 8 to 14 μm was higher than 0.5% and 0.73% or lower. The reflectance R(%) was obtained from "R(%)=100−T(%)" based on the transmittance T obtained by FT-IR. The measurement range of the transmittance T was 7 to 15 μm.

The average reflectance was a value obtained by obtaining reflectances R at an interval of 4 $cm^{-1}$ (kayser) in a wavelength range of 8 to 14 μm and dividing the sum of the obtained reflectances R by the number of data. The kayser refers to the wave number at a length of 1 cm and expressed in [$cm^{-1}$]. Accordingly, a relationship between a reference wavelength λ0 [cm] and the kayser k [$cm^{-1}$] is defined as the following conditional expression.

$$\lambda n = 1/(1/\lambda 0 \pm (n-1) \times k)$$

In this expression, n represents a natural number of 1 or more, and a wavelength λ1 measured in the event that n=1 matches with the reference wavelength λ0. The symbol ± can be appropriately selected depending on whether to obtain a wavelength on a longer wavelength side or a shorter wavelength side with respect to the reference wavelength.

Example 1

Figure 9:
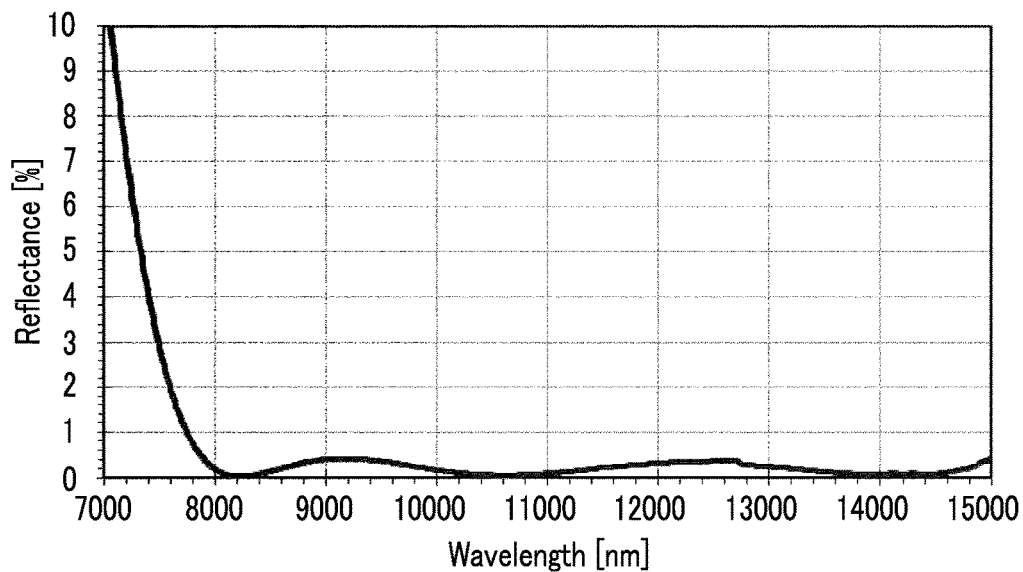
FIG. 9 is a graph showing a relationship between a wavelength and a reflectance in an antireflection film according to Example 1.

The hydrogenated carbon film 17 and the $MgF_2$ film 18 were alternately formed on the optical substrate 11 formed of chalcogenide glass (KG-1) to prepare the antireflection film 10 having a five-layer configuration shown in Table 2. FIG. 9 shows the reflection properties of the prepared antireflection film 10 in a wavelength range of 7 to 15 μm. As can be seen from FIG. 9, the average reflectance in a wavelength range of 8 to 14 μm was 0.21%, and the reflection properties were flat.

TABLE 2

| Example 1 | Refractive Index at 10.5 μm | Physical Thickness [nm] | Optical Thickness [nm] |
|---|---|---|---|
| Fifth Layer | 1.7 | 98 | 167 |
| Fourth Layer | 1.2 | 2531 | 3022 |
| Third Layer | 1.7 | 620 | 1055 |
| Second Layer | 1.2 | 923 | 1102 |
| First Layer | 2.0 | 1462 | 2925 |
| Average Reflectance (8 to 14 μm) | | 0.21 | |

Example 2

Figure 10:
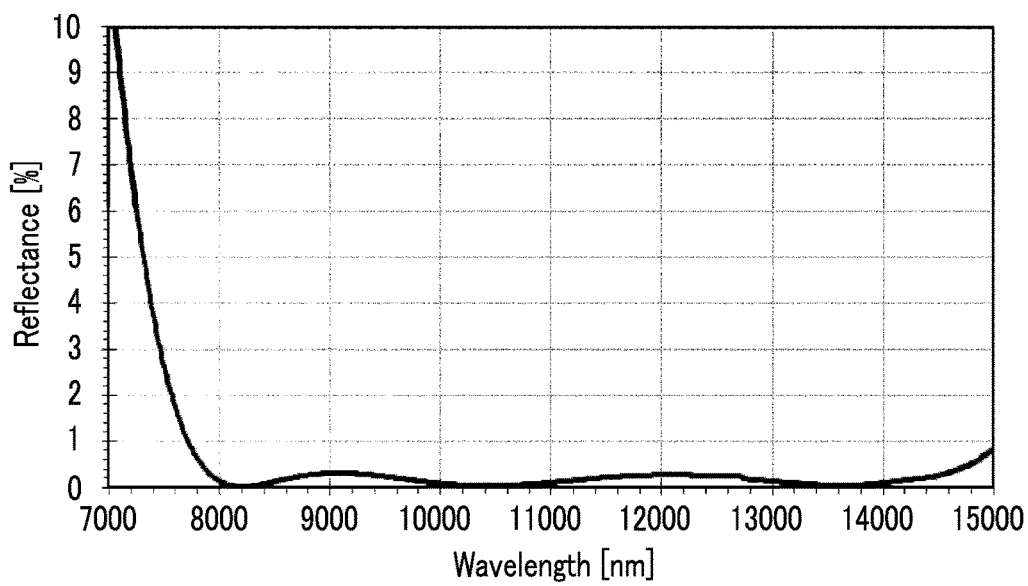
FIG. 10 is a graph showing a relationship between a wavelength and a reflectance in an antireflection film according to Example 2.

An antireflection film 10 having a five-layer configuration and having optical thicknesses as shown in Table 3 was prepared on the same optical substrate 11 as in Example 1. The antireflection film 10 was prepared using the same method as in Example 1, except that: the refractive index of the third layer 14 and the fifth layer 16 was changed from 1.7 to 2.2; and the thickness of each layer was changed. FIG. 10 shows the reflection properties of the prepared antireflection film 10 in a wavelength range of 7 to 15 μm. As can be seen from FIG. 10, the average reflectance in a wavelength range of 8 to 14 μm was 0.15%, and the reflection properties were flat.

TABLE 3

| Example 2 | Refractive Index at 10.5 μm | Physical Thickness [nm] | Optical Thickness [nm] |
|---|---|---|---|
| Fifth Layer | 2.2 | 49 | 108 |
| Fourth Layer | 1.2 | 2523 | 3013 |
| Third Layer | 2.2 | 279 | 615 |
| Second Layer | 1.2 | 1052 | 1257 |
| First Layer | 2.0 | 1484 | 2967 |
| Average Reflectance (8 to 14 μm) | | 0.15 | |

Example 3

Figure 11:
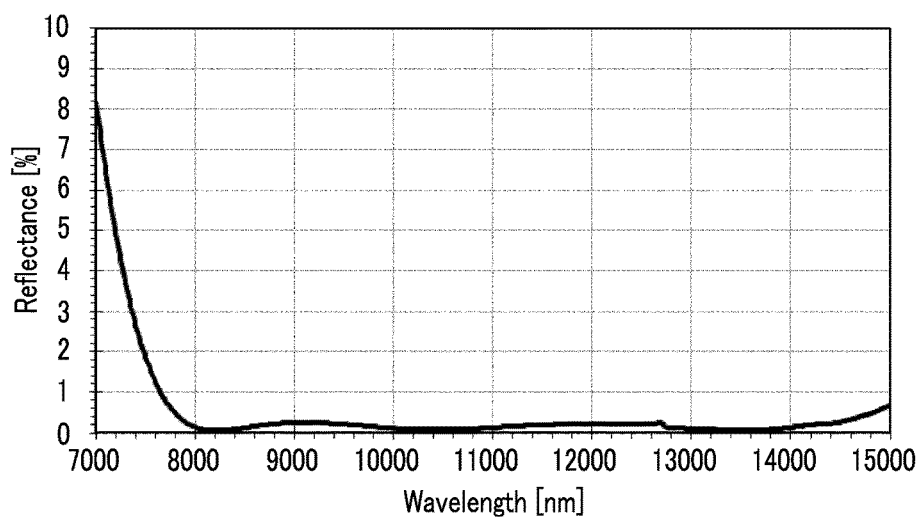
FIG. 11 is a graph showing a relationship between a wavelength and a reflectance in an antireflection film according to Example 3.

An antireflection film 10 having a five-layer configuration and having optical thicknesses as shown in Table 4 was prepared on the same optical substrate 11 as in Example 1. The antireflection film 10 was prepared using the same method as in Example 1, except that: the refractive index of the first layer 12 was changed from 2.0 to 2.1; and the thickness of each layer was changed. FIG. 11 shows the reflection properties of the prepared antireflection film 10 in a wavelength range of 7 to 15 μm. As can be seen from FIG. 11, the average reflectance in a wavelength range of 8 to 14 μm was 0.15%, and the reflection properties were flat.

TABLE 4

| Example 3 | Refractive Index at 10.5 μm | Physical Thickness [nm] | Optical Thickness [nm] |
|---|---|---|---|
| Fifth Layer | 1.7 | 118 | 200 |
| Fourth Layer | 1.2 | 2293 | 2739 |
| Third Layer | 1.7 | 774 | 1316 |
| Second Layer | 1.2 | 723 | 863 |
| First Layer | 2.1 | 1379 | 2896 |
| Average Reflectance (8 to 14 μm) | | 0.15 | |

Example 4

Figure 12:
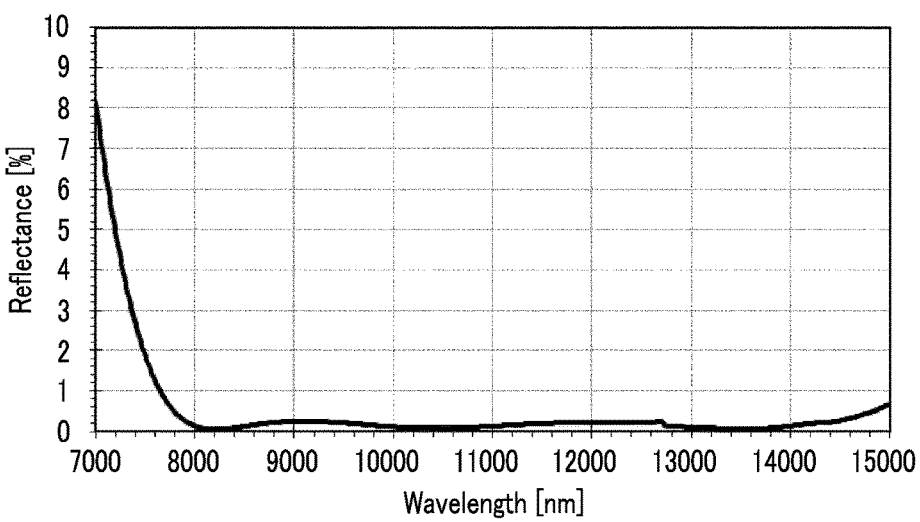
FIG. 12 is a graph showing a relationship between a wavelength and a reflectance in an antireflection film according to Example 4.

An antireflection film 10 having a five-layer configuration and having optical thicknesses as shown in Table 5 was prepared on the same optical substrate 11 as in Example 1. The antireflection film 10 was prepared using the same method as in Example 2, except that: the refractive index of the first layer 12 was changed from 2.0 to 2.1; and the thickness of each layer was changed. FIG. 12 shows the reflection properties of the prepared antireflection film 10 in a wavelength range of 7 to 15 μm. As can be seen from FIG. 12, the average reflectance in a wavelength range of 8 to 14 μm was 0.11%, and the reflection properties were flat.

TABLE 5

| Example 4 | Refractive Index at 10.5 μm | Physical Thickness [nm] | Optical Thickness [nm] |
|---|---|---|---|
| Fifth Layer | 2.2 | 79 | 175 |
| Fourth Layer | 1.2 | 2178 | 2600 |
| Third Layer | 2.2 | 353 | 777 |
| Second Layer | 1.2 | 887 | 1060 |
| First Layer | 2.1 | 1424 | 2990 |
| Average Reflectance (8 to 14 μm) | | 0.11 | |

Example 5

Figure 13:
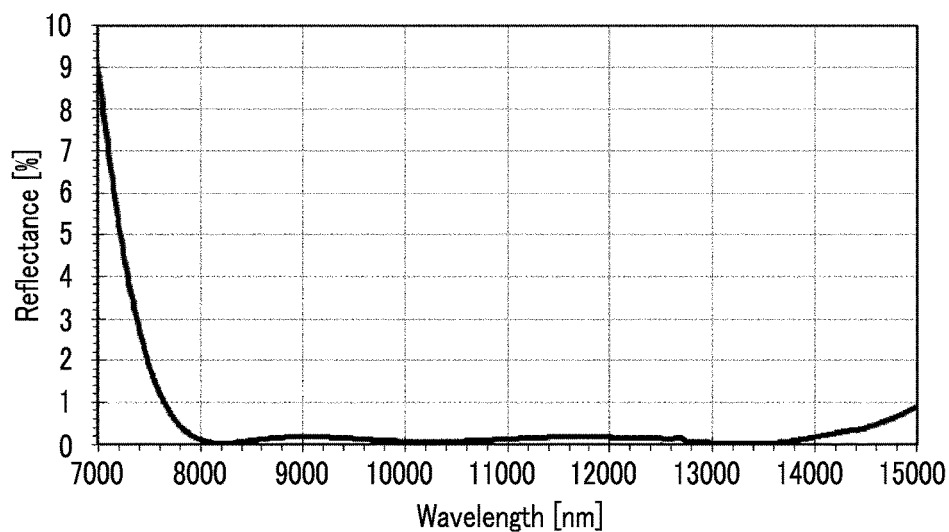
FIG. 13 is a graph showing a relationship between a wavelength and a reflectance in an antireflection film according to Example 5.

An antireflection film 10 having a five-layer configuration and having optical thicknesses as shown in Table 6 was prepared on the same optical substrate 11 as in Example 1. The antireflection film 10 was prepared using the same method as in Example 1, except that: the refractive index of the first layer 12 was changed from 2.0 to 2.2; and the thickness of each layer was changed. FIG. 13 shows the reflection properties of the prepared antireflection film 10 in a wavelength range of 7 to 15 μm. As can be seen from FIG. 13, the average reflectance in a wavelength range of 8 to 14 μm was 0.13%, and the reflection properties were flat.

TABLE 6

| Example 5 | Refractive Index at 10.5 μm | Physical Thickness [nm] | Optical Thickness [nm] |
|---|---|---|---|
| Fifth Layer | 1.7 | 168 | 285 |
| Fourth Layer | 1.2 | 1961 | 2342 |
| Third Layer | 1.7 | 992 | 1687 |
| Second Layer | 1.2 | 516 | 616 |
| First Layer | 2.2 | 1301 | 2863 |
| Average Reflectance (8 to 14 μm) | | 0.13 | |

Example 6

Figure 14:
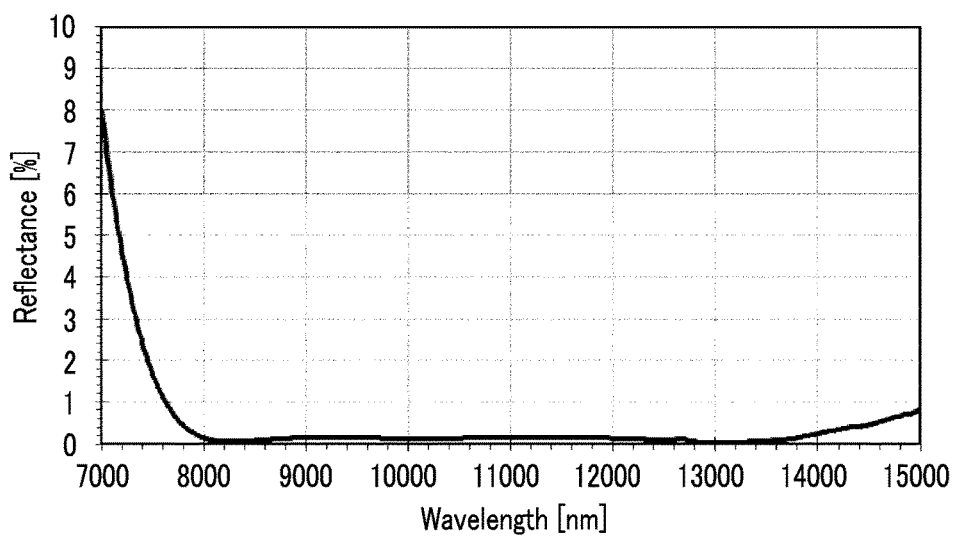
FIG. 14 is a graph showing a relationship between a wavelength and a reflectance in an antireflection film according to Example 6.

An antireflection film 10 having a five-layer configuration and having optical thicknesses as shown in Table 7 was prepared on the same optical substrate 11 as in Example 1. The antireflection film 10 was prepared using the same method as in Example 2, except that: the refractive index of the first layer 12 was changed from 2.0 to 2.2; and the thickness of each layer was changed. FIG. 14 shows the reflection properties of the prepared antireflection film 10 in a wavelength range of 7 to 15 µm. As can be seen from FIG. 14, the average reflectance in a wavelength range of 8 to 14 µm was 0.12%, and the reflection properties were flat.

TABLE 7

| Example 6 | Refractive Index at 10.5 µm | Physical Thickness [nm] | Optical Thickness [nm] |
|---|---|---|---|
| Fifth Layer | 2.2 | 116 | 255 |
| Fourth Layer | 1.2 | 1871 | 2234 |
| Third Layer | 2.2 | 439 | 967 |
| Second Layer | 1.2 | 737 | 880 |
| First Layer | 2.2 | 1378 | 3032 |
| Average Reflectance (8 to 14 µm) | | 0.12 | |

Example 7

Figure 15:
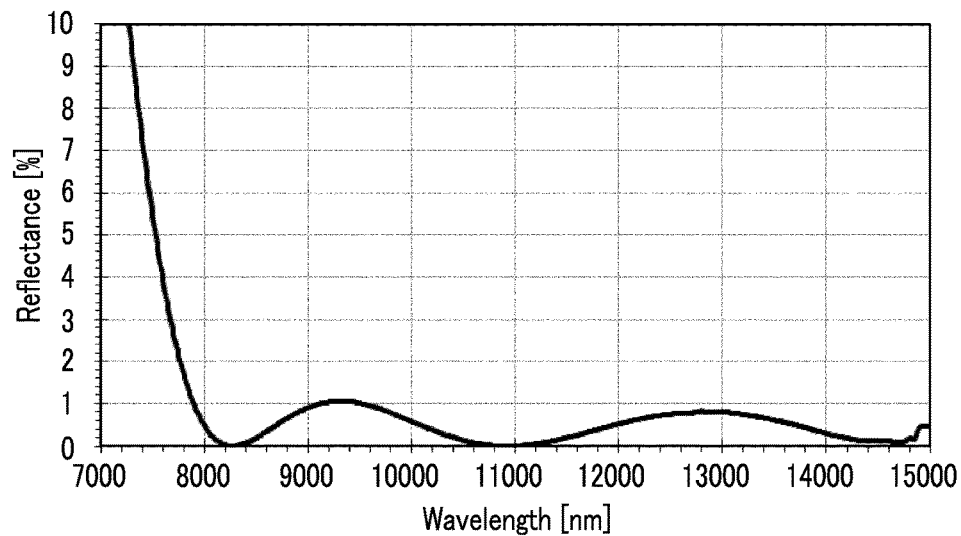
FIG. 15 is a graph showing a relationship between a wavelength and a reflectance in an antireflection film according to Example 7.

An antireflection film 10 having a five-layer configuration and having optical thicknesses as shown in Table 8 was prepared on the same optical substrate 11 as in Example 1. The antireflection film 10 was prepared using the same method as in Example 1, except that: the refractive index of the first layer 12 was changed from 2.0 to 1.8; and the thickness of each layer was changed. FIG. 15 shows the reflection properties of the prepared antireflection film 10 in a wavelength range of 7 to 15 µm. As can be seen from FIG. 15, the average reflectance in a wavelength range of 8 to 14 µm was 0.49%, and the reflection properties were substantially flat although the flatness thereof deteriorated as compared to Examples 1 to 6.

TABLE 8

| Example 7 | Refractive Index at 10.5 µm | Physical Thickness [nm] | Optical Thickness [nm] |
|---|---|---|---|
| Fifth Layer | 1.7 | 98 | 167 |
| Fourth Layer | 1.2 | 2816 | 3363 |
| Third Layer | 1.7 | 368 | 625 |
| Second Layer | 1.2 | 1396 | 1667 |
| First Layer | 1.8 | 1594 | 2868 |
| Average Reflectance (8 to 14 µm) | | 0.49 | |

Example 8

Figure 16:
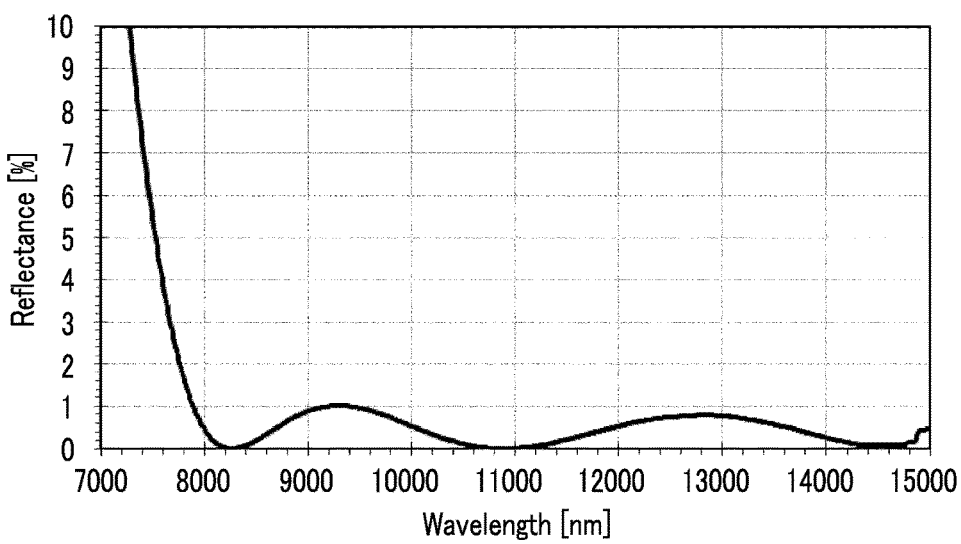
FIG. 16 is a graph showing a relationship between a wavelength and a reflectance in an antireflection film according to Example 8.

An antireflection film 10 having a five-layer configuration and having optical thicknesses as shown in Table 9 was prepared on the same optical substrate 11 as in Example 1. The antireflection film 10 was prepared using the same method as in Example 7, except that: the refractive index of the third layer 14 and the fifth layer 16 was changed from 1.7 to 1.8; and the thickness of each layer was changed. FIG. 16 shows the reflection properties of the prepared antireflection film 10 in a wavelength range of 7 to 15 µm. As can be seen from FIG. 16, the average reflectance in a wavelength range of 8 to 14 µm was 0.48%, and the reflection properties were substantially flat although the flatness thereof deteriorated as compared to Examples 1 to 6.

TABLE 9

| Example 8 | Refractive Index at 10.5 µm | Physical Thickness [nm] | Optical Thickness [nm] |
|---|---|---|---|
| Fifth Layer | 1.8 | 82 | 148 |
| Fourth Layer | 1.2 | 2803 | 3348 |
| Third Layer | 1.8 | 311 | 560 |
| Second Layer | 1.2 | 1410 | 1684 |
| First Layer | 1.8 | 1602 | 2884 |
| Average Reflectance (8 to 14 µm) | | 0.48 | |

Example 9

Figure 17:
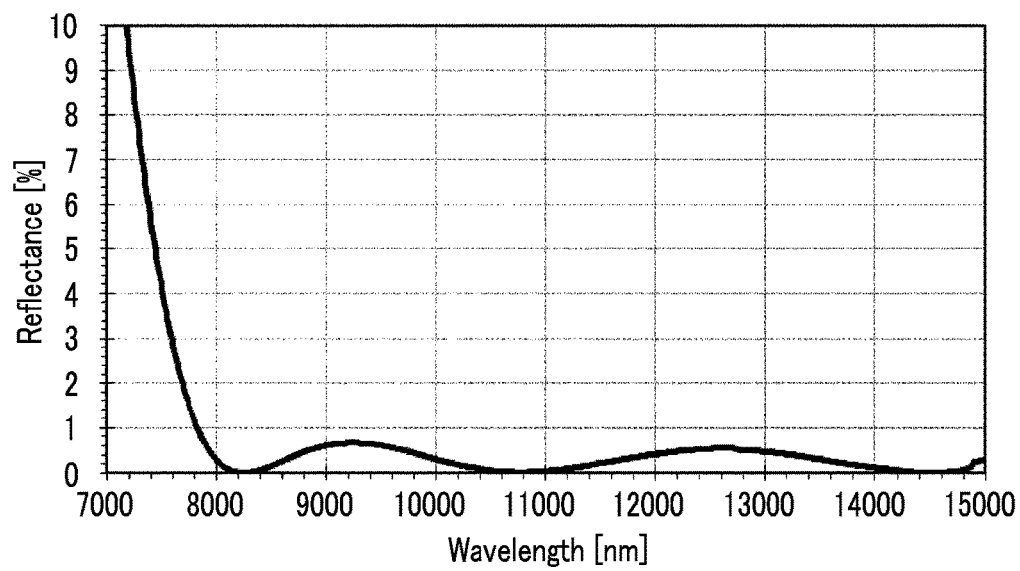
FIG. 17 is a graph showing a relationship between a wavelength and a reflectance in an antireflection film according to Example 9.

An antireflection film 10 having a five-layer configuration and having optical thicknesses as shown in Table 10 was prepared on the same optical substrate 11 as in Example 1. The antireflection film 10 was prepared using the same method as in Example 7, except that: the refractive index of the first layer 12 was changed from 1.8 to 1.9; and the thickness of each layer was changed. FIG. 17 shows the reflection properties of the prepared antireflection film 10 in a wavelength range of 7 to 15 µm. As can be seen from FIG. 17, the average reflectance in a wavelength range of 8 to 14 µm was 0.32%, and the reflection properties were substantially flat although the flatness thereof deteriorated as compared to Examples 1 to 6.

TABLE 10

| Example 9 | Refractive Index at 10.5 µm | Physical Thickness [nm] | Optical Thickness [nm] |
|---|---|---|---|
| Fifth Layer | 1.7 | 97 | 165 |
| Fourth Layer | 1.2 | 2688 | 3210 |
| Third Layer | 1.7 | 490 | 832 |
| Second Layer | 1.2 | 1140 | 1362 |
| First Layer | 1.9 | 1534 | 2914 |
| Average Reflectance (8 to 14 µm) | | 0.32 | |

Example 10

Figure 18:
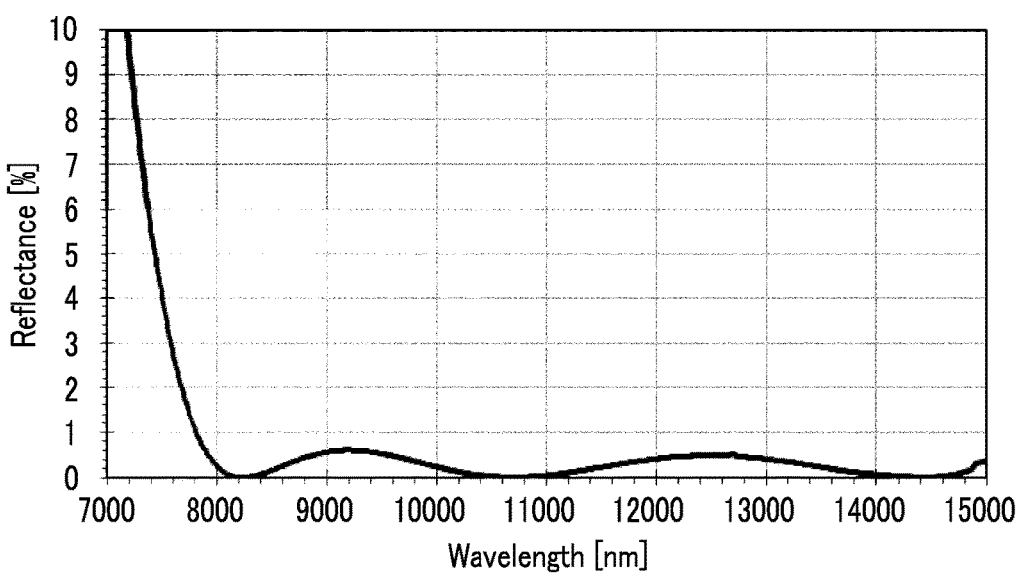
FIG. 18 is a graph showing a relationship between a wavelength and a reflectance in an antireflection film according to Example 10.

An antireflection film 10 having a five-layer configuration and having optical thicknesses as shown in Table 11 was prepared on the same optical substrate 11 as in Example 1. The antireflection film 10 was prepared using the same method as in Example 9, except that: the refractive index of the third layer 14 and the fifth layer 16 was changed from 1.7 to 1.9; and the thickness of each layer was changed. FIG. 18 shows the reflection properties of the prepared antireflection film 10 in a wavelength range of 7 to 15 µm. As can be seen from FIG. 18, the average reflectance in a wavelength range of 8 to 14 µm was 0.28%, and the reflection properties were substantially flat although the flatness thereof deteriorated as compared to Examples 1 to 6.

TABLE 11

| Example 10 | Refractive Index at 10.5 μm | Physical Thickness [nm] | Optical Thickness [nm] |
|---|---|---|---|
| Fifth Layer | 1.9 | 69 | 130 |
| Fourth Layer | 1.2 | 2679 | 3199 |
| Third Layer | 1.9 | 346 | 658 |
| Second Layer | 1.2 | 1189 | 1420 |
| First Layer | 1.9 | 1548 | 2942 |
| Average Reflectance (8 to 14 μm) | | 0.28 | |

Example 11

Figure 19:
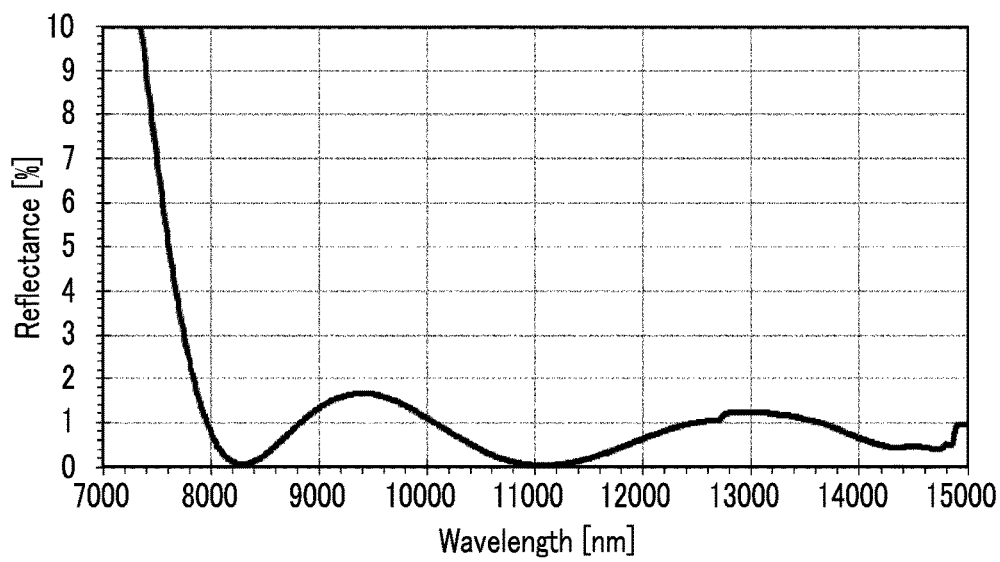
FIG. 19 is a graph showing a relationship between a wavelength and a reflectance in an antireflection film according to Example 11.

An antireflection film 10 having a five-layer configuration and having optical thicknesses as shown in Table 12 was prepared on the same optical substrate 11 as in Example 1. The antireflection film 10 was prepared using the same method as in Example 1, except that: the refractive index of the first layer 12 was changed from 2.0 to 1.7; and the thickness of each layer was changed. FIG. 19 shows the reflection properties of the prepared antireflection film 10 in a wavelength range of 7 to 15 μm. As can be seen from FIG. 19, the average reflectance in a wavelength range of 8 to 14 μm was 0.79%, and the reflection properties were substantially flat although the flatness thereof deteriorated as compared to Examples 7 to 9.

TABLE 12

| Example 11 | Refractive Index at 10.5 μm | Physical Thickness [nm] | Optical Thickness [nm] |
|---|---|---|---|
| Fifth Layer | 1.7 | 103 | 174 |
| Fourth Layer | 1.2 | 2873 | 3431 |
| Third Layer | 1.7 | 265 | 450 |
| Second Layer | 1.2 | 1716 | 2049 |
| First Layer | 1.7 | 1643 | 2794 |
| Average Reflectance (8 to 14 μm) | | 0.79 | |

Example 12

Figure 20:
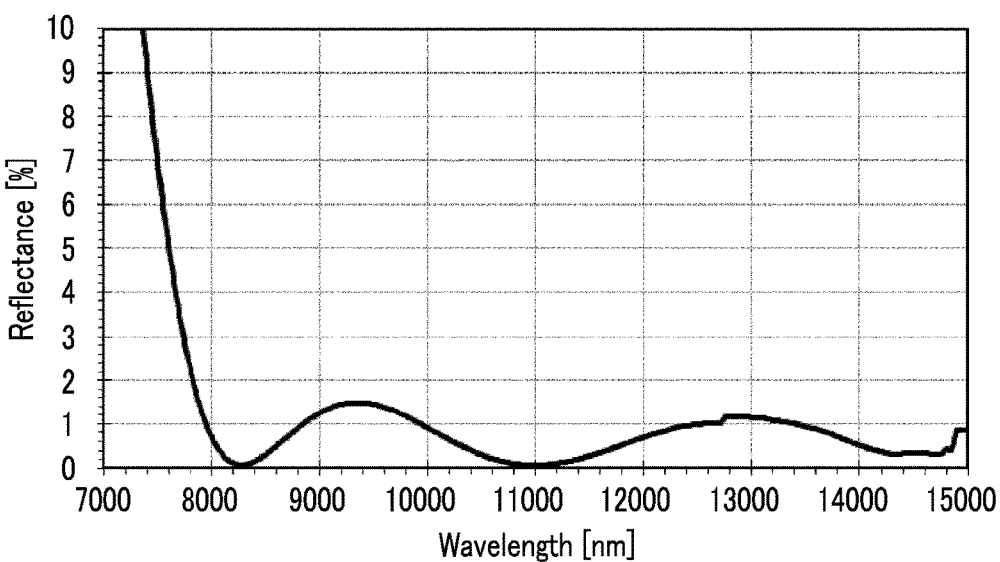
FIG. 20 is a graph showing a relationship between a wavelength and a reflectance in an antireflection film according to Example 12.

An antireflection film 10 having a five-layer configuration and having optical thicknesses as shown in Table 13 was prepared on the same optical substrate 11 as in Example 1. The antireflection film 10 was prepared using the same method as in Example 11, except that: the refractive index of the third layer 14 was changed from 1.7 to 2.2; and the thickness of each layer was changed. FIG. 20 shows the reflection properties of the prepared antireflection film 10 in a wavelength range of 7 to 15 μm. As can be seen from FIG. 20, the average reflectance in a wavelength range of 8 to 14 μm was 0.73%, and the reflection properties were substantially flat although the flatness thereof deteriorated as compared to Examples 7 to 9.

TABLE 13

| Example 12 | Refractive Index at 10.5 μm | Physical Thickness [nm] | Optical Thickness [nm] |
|---|---|---|---|
| Fifth Layer | 1.7 | 114 | 193 |
| Fourth Layer | 1.2 | 2787 | 3323 |
| Third Layer | 2.2 | 141 | 310 |
| Second Layer | 1.2 | 1712 | 2045 |
| First Layer | 1.7 | 1673 | 2845 |
| Average Reflectance (8 to 14 μm) | | 0.73 | |

Example 13

Figure 21:
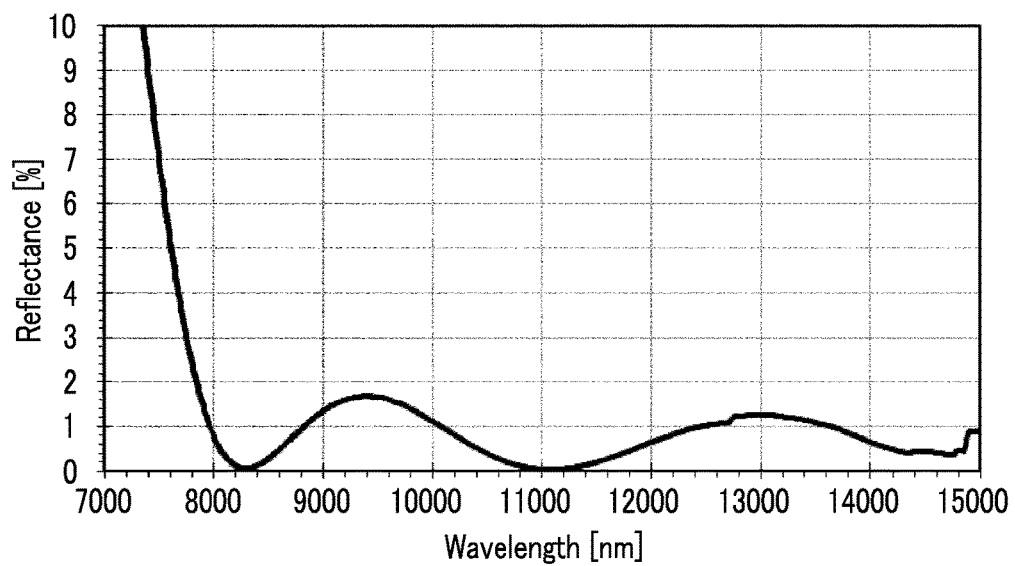
FIG. 21 is a graph showing a relationship between a wavelength and a reflectance in an antireflection film according to Example 13.

An antireflection film 10 having a five-layer configuration and having optical thicknesses as shown in Table 14 was prepared on the same optical substrate 11 as in Example 1. The antireflection film 10 was prepared using the same method as in Example 11, except that: the refractive index of the fifth layer 16 was changed from 1.7 to 2.2; and the thickness of each layer was changed. FIG. 21 shows the reflection properties of the prepared antireflection film 10 in a wavelength range of 7 to 15 μm. As can be seen from FIG. 21, the average reflectance in a wavelength range of 8 to 14 μm was 0.80%, and the reflection properties were substantially flat although the flatness thereof deteriorated as compared to Examples 7 to 9.

TABLE 14

| Example 13 | Refractive Index at 10.5 μm | Physical Thickness [nm] | Optical Thickness [nm] |
|---|---|---|---|
| Fifth Layer | 2.2 | 59 | 129 |
| Fourth Layer | 1.2 | 2922 | 3489 |
| Third Layer | 1.7 | 257 | 436 |
| Second Layer | 1.2 | 1723 | 2057 |
| First Layer | 1.7 | 1640 | 2789 |
| Average Reflectance (8 to 14 μm) | | 0.80 | |

EXPLANATION OF REFERENCES

10: antireflection film
11: optical substrate
12: first layer
13: second layer
14: third layer
15: fourth layer
16: fifth layer
17: hydrogenated carbon film
18: $MgF_2$ film
21: sputtering equipment
25: substrate holder
28 and 29: target holder
32: carbon target
33: $MgF_2$ target

What is claimed is:
1. An antireflection film comprising:
a substrate formed of chalcogenide glass in which the sum of a composition ratio of germanium and a composition ratio of selenium is 60% or higher;
a multiple layer structure formed on the substrate, and including first to fifth layers in order from the substrate;

wherein the first, third and fifth layers are high refractive index layers formed of hydrogenated carbon films, and have a refractive index of 1.7 to 2.25 at a wavelength of 10.5 μm, the second and fourth layers are low refractive index layers formed of $MgF_2$ films, and have a lower refractive index than the high refractive index layers, the first layer has an optical thickness in a range of 2700 nm to 3100 nm, the second layer has an optical thickness in a range of 600 nm to 2100 nm, the third layer has an optical thickness in a range of 300 nm to 1700 nm, the fourth layer has an optical thickness in a range of 2200 nm to 3500 nm, and the fifth layer has an optical thickness in a range of 100 nm to 300 nm, and has a hydrogen content ch in a range of $0$ [at. %]$<ch \leq 7.5$ [at. %].

2. The antireflection film according to claim 1, wherein the substrate has a refractive index of 2.4 to 2.6 at a wavelength of 10.5 μm and has a reflectance of 0.5% or lower in a wavelength range of 8 μm to 14 μm.

3. A chalcogenide glass lens comprising the antireflection film according to claim 1.

4. An imaging device comprising at least one chalcogenide glass lens including the antireflection film according to claim 1.

* * * * *